R. S. HARRINGTON.
CLOTHES POUNDER.
APPLICATION FILED AUG. 8, 1907.
919,164.
Patented Apr. 20, 1909.
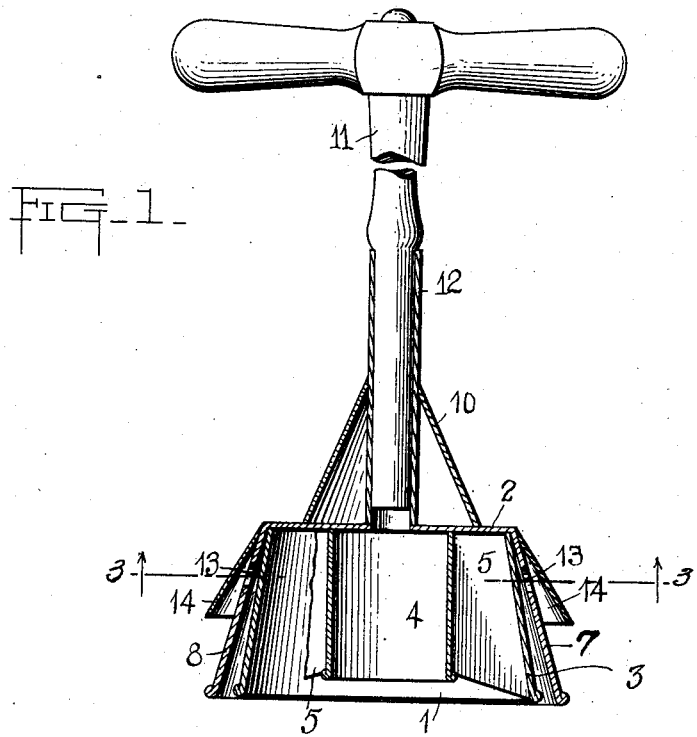
 
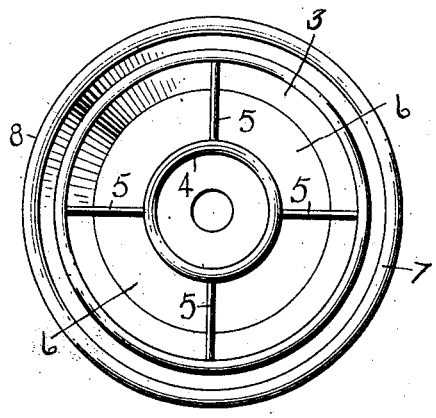 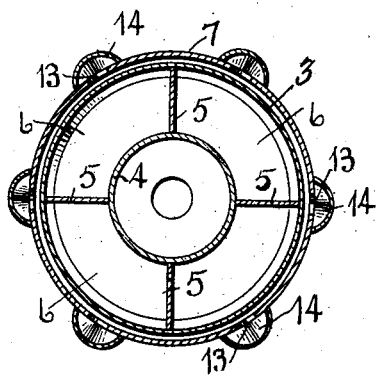
Witnesses
L. B. James
C. H. Griesbauer
Inventor
Rufus S. Harrington
by H. B. Willson & Co.
Attorneys

UNITED STATES PATENT OFFICE.

RUFUS S. HARRINGTON, OF CORVALLIS, OREGON.

CLOTHES-POUNDER.

No. 919,164.      Specification of Letters Patent.      Patented April 20, 1909.

Application filed August 8, 1907. Serial No. 387,671.

*To all whom it may concern:*

Be it known that I, RUFUS S. HARRINGTON, a citizen of the United States, residing at Corvallis, in the county of Benton and State of Oregon, have invented certain new and useful Improvements in Clothes-Pounders; and I do declare the following to be a full, clear, and exact description of the invention, such as will enable others skilled in the art to which it appertains to make and use the same.

This invention relates to clothes pounders, and has for its object to provide a simple and inexpensive device of this character and through the use of which clothes may be readily cleaned.

With these and other objects in view, the invention consists of certain novel features of construction, combination and arrangement of parts, as will be more fully described and particularly pointed out in the appended claim.

In the drawings, Figure 1 is a central vertical section, Fig. 2 is a bottom plan view, and Fig. 3 is a horizontal section on the line 3—3 of Fig. 1.

Referring more especially to the drawings, 1 represents a tubular member having flaring sides 3, which are surrounded by a cup-shaped member 7, having a top 2 to which the member 1 is secured in any suitable manner, as by soldering. The sides of the member 7 flare as at 8 in Fig. 1 and are gradually spaced from the sides 3 of the member 1 so as to form a gradually decreasing space as their junction is approached. The sides of the member 7 are preferably longer than the sides of the member 1 so as to form a guard which effectually prevents the splashing of expelled water, and adjacent the top thereof is provided a plurality of circumferentially spaced apertures 13 which are each covered by independent guards 14 which gradually increase in width from their upper ends to their lower ends and extend outwardly from their attached portions over the apertures so as to deflect the water downwardly as it emerges therefrom.

Depending from the top 2 of the cup-shaped member 7 is a cylindrical tube 4, shorter in length than the member 1, and which is connected thereto by quarterly spaced partitions 5, inclined on their lower face so as to evenly extend between the lower edges of the members 4 and 1. These partitions separate the space between the members 4 and 1 into compartments 6.

In the center of the top 2 there is secured a tubular handle member 12 in which the handle 11 is secured, and surrounding the member 12 and connected thereto and to the top 2 is a conical bracing strut 10, which strengthens the entire structure.

From the foregoing description, taken in connection with the accompanying drawings, the construction and operation of the invention will be readily understood without requiring a more extended explanation.

Having thus described my invention, what I claim and desire to secure by Letters Patent is:—

A clothes pounder comprising an outer flaring member having a series of apertures arranged at suitable distances apart around its body portion and provided with a flat top having a socket therein which is adapted to receive a handle therein, a cone-shaped reinforce secured midway to the socket and inclosing the same, said reinforce being also secured to the top, an inner flaring member constructed of a length shorter than the outer member and spaced therefrom its entire length and having its upper edge secured to the under surface of said top, a depending tube secured to the top and arranged centrally within the inner member and constructed of a length shorter than the same, a plurality of diametrically arranged partitions secured to the tube and to the inner member, and semi-cone shaped members secured to the outer member and over the apertures therein and extending midway down the side of said outer member, substantially as specified.

In testimony whereof I have hereunto set my hand in presence of two subscribing witnesses.

RUFUS S. HARRINGTON.

Witnesses:
     R. H. RUTHERFORD,
     W. E. KEYES.